July 14, 1964 T. J. SCARPA 3,140,859
ELECTROACOUSTIC SANDWICH TRANSDUCERS
Filed Jan. 17, 1961 3 Sheets-Sheet 1
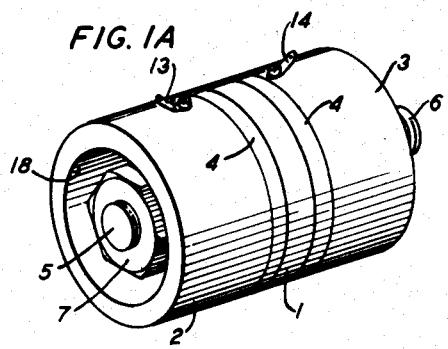
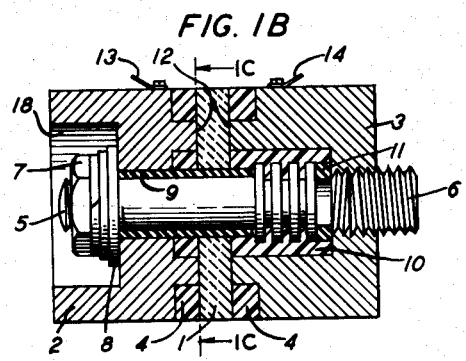
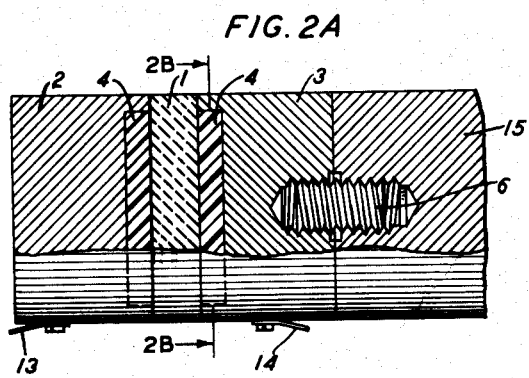
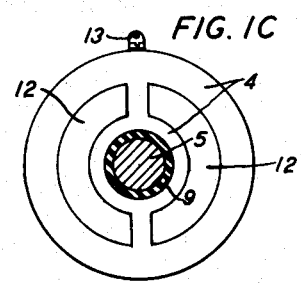
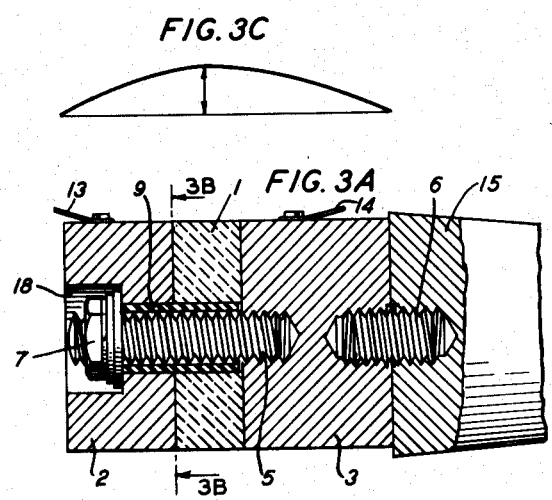
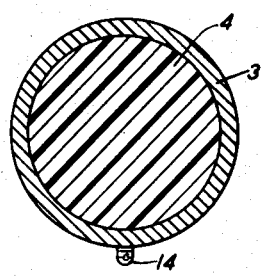
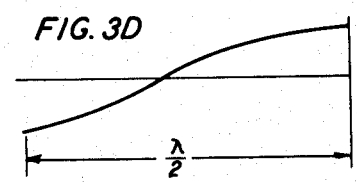
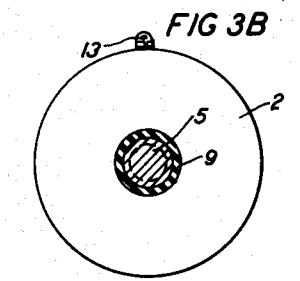
INVENTOR
THOMAS J. SCARPA
BY
AGENT

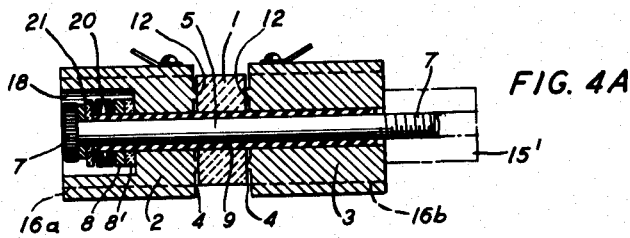
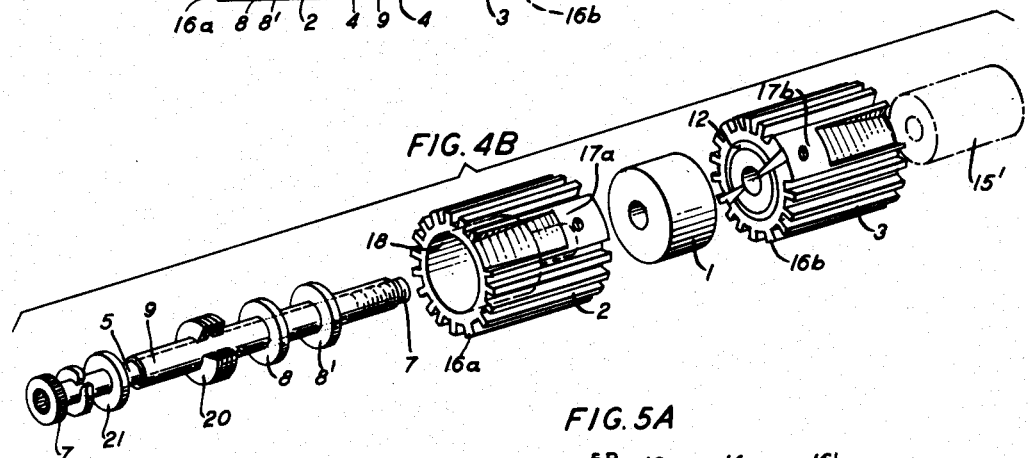
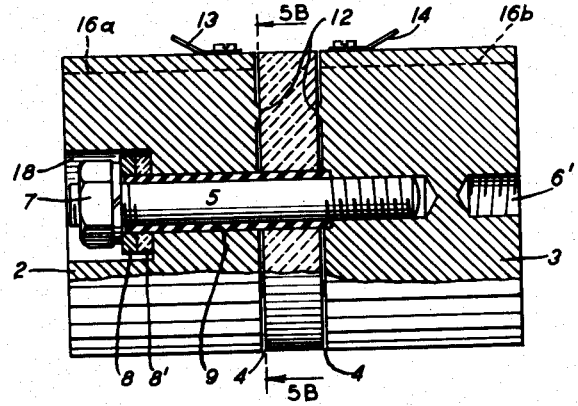
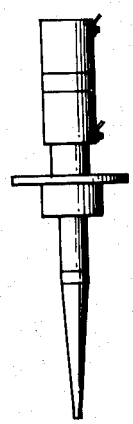
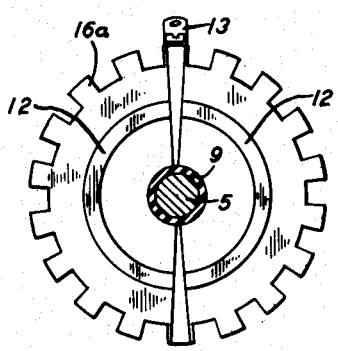

July 14, 1964 T. J. SCARPA 3,140,859
ELECTROACOUSTIC SANDWICH TRANSDUCERS
Filed Jan. 17, 1961 3 Sheets-Sheet 3

INVENTOR
THOMAS J. SCARPA
BY Martha L. Pugh
AGENT

United States Patent Office 3,140,859
Patented July 14, 1964

3,140,859
ELECTROACOUSTIC SANDWICH TRANSDUCERS
Thomas J. Scarpa, Metuchen, N.J., assignor to International Ultrasonics, Inc., Cranford, N.J., a corporation of New Jersey
Filed Jan. 17, 1961, Ser. No. 80,515
20 Claims. (Cl. 259—1)

This invention relates in general to compressional wave transducers, and more particularly, to piezoelectric sandwich transducers having enhanced coupling characteristics, and systems employing the same to particular advantage.

A form of piezoelectric transducer which has been found in the prior art to be particularly flexible in application, and economical to construct, is the so-called sandwich transducer, which takes the form of a wafer of piezoelectric material, preferably of ceramic material, sandwiched between a pair of cylindrical metal members which have sound-transmitting characteristics substantially equal to those of the ceramic wafer, and relatively high thermal conductivity. The metal members are so proportioned that the thickness of the sandwich along its axis approximates a half wave-length in the resonant vibrational frequency of the unit. A sandwich transducer of the general form described is disclosed in United States Patent 2,895,061 to James H. Probus, issued July 14, 1959.

When a piezoelectric sandwich transducer of the form disclosed by Probus is rigidly bonded to drive a system to vibrate ultrasonically, it is necessary to design the system to operate within a narrow band of frequencies at or near mechanical resonance, in order to avoid a substantial loss in vibratory power, the magnitude of which is a function of the vibratory "Q" or figure of merit of the vibrator.

It is the general object of the present invention to improve electroacoustical transducers in relation to the systems to which they are coupled in driving relation; and more particularly, to improve the structural design of the piezoelectric sandwich transducer by enhancing the mechanical coupling of the vibrator, both internally and externally. Another object of the invention is to increase the flexibility and utility of systems employing piezoelectric vibrators by adapting such systems for operation over a wide range of frequencies. A still further object is to facilitate replacement or substitution of driving units in ultrasonic systems.

It is contemplated that these and other objects will be attained in accordance with the present invention by the application of improved techniques in the treatment of the components of the sandwich prior to assembly, in the bonding of the components, and in novel arrangements for coupling the transducer assembly in ultrasonic driving relation to an external system.

It is well known that when a crystalline body is piezoelectric, either naturally or as the result of artificial poling, the application of an alternating current potential across the element will produce mechanical deformations which are synchronized with the alternating current frequency. These mechanical deformations are in different vibrational modes, including a longitudinal component in the direction of the applied field and a shear component normal to the direction of the applied field, which are a quarter-wave out of phase.

In a cylindrical transducer, for example, which is designed to be an electrical half-wave-length in the vibrating frequency, a nodal plane passes through the center of the cylindrical piezoelectric element, where the displacement amplitude for the longitudinal component is at a minimum and for the shear component is at a maximum. By contrast, at the antinodal planes, which are located an electrical quarter-wave-length along the axis of the transducer on both sides of the central nodal plane, the displacement amplitude of the longitudinal component is at a maximum and that of the shear component is at a minimum.

It has been found in accordance with the present invention that whereas strong, rigid bonds are necessary at those junctions between the components of the vibrating system which are close to the central nodal plane in order to prevent lateral motion, strong bonding is unnecessary in the antinodal positions where the lateral component of the vibratory motion is minimized.

Moreover, I have found that in a sandwich transducer such as disclosed by Probus Patent 2,895,061, supra, the junctions between the faces of the piezoelectric wafer and the metal elements, which are relatively near the nodal plane, are in preferred arrangement securely bonded to prevent lateral motion thereof; whereas, the junction between the driving transducer and the driven system, which junction is at the outer face of one of the sandwich elements, can be securely coupled for efficient vibration transmission without rigidly bonding the surfaces together. Thus, efficient electromechanical coupling can be accomplished by applying the flat, external surface of one of the metal backing elements of the sandwich transducer to a surface of the driven system without rigid bonding means, and maintaining the surfaces in contiguous alignment by means of an axially disposed screw or stud protruding from a surface of the driven system, which screw or stud may or may not be of such a length as to pass completely through the sandwich along its axis. Moreover, the vibrator can be screwed or otherwise fastened to the driven surface in such a manner that it can be readily disassembled, but is nevertheless secured in intimate ultrasonic coupling relation, provided that the contacting metal surfaces have been previously processed in the manner taught herein. The coupling coefficient is substantially increased at the antinodal junction where no rigid bonding agent is employed, by the application of a liquid or semisolid acoustic transmitting medium such as silicone grease.

Moreover, I have discovered that when each of the elements of the piezoelectric sandwich transducer is treated in accordance with the teachings of this invention prior to assembly, a marked increase is realized in the ultrasonic transducing efficiency; and the over-all "Q" of the vibrating system is substantially lowered.

If the wafer of piezoelectric crystalline material, which in preferred embodiment is a ceramic element, initially includes on its parallel major faces coatings of silver paste, or some other conducting material which has been baked on or otherwise bonded to the surface for the purpose of initially poling the element, these coatings are carefully removed, for example, by lapping, prior to assembly of the sandwich. Moreover, prior to assembly, each of the elements of the sandwich is subjected to ultrasonic cleaning while immersed in a suitable ultrasonic transmitting medium such as, for example, acetone or hot water including a detergent. Further, those surfaces of the metal backing elements of the sandwich combination which come in contact with the ceramic surfaces, or with a surface of the driven system, are etched clean with a mild acid solution prior to assemblage.

I have further discovered that when the ceramic and metal surfaces have been prepared in the manner prescribed herein, a bonding agent, such as epoxy resin cured in a conventional manner, adheres effectively to the surfaces of the ceramic and metal backing elements without intervening coatings, thereby providing efficient acoustic couplings at those junctions relatively near the nodal planes. Further, I have found that the acoustic coupling properties of the junctions are enhanced if the epoxy bonding material is forced into the junctions between the contiguous elements under a vacuum pressure of about 40 pounds per square inch. Still further enhancement of the acoustic coupling characteristics at the junctions has been realized by the use of an epoxy bonding material through which particles of electrically conducting material have been dispersed.

A particular feature of the present invention is the application of its teachings to the design and preparation of driving units as cooperating parts of those types of vibratory systems in which a large measure of flexibility is required as to the frequency of operation, or where replaceability of parts is particularly desirable. Ultrasonic washing or cleaning devices and also ultrasonic welding and soldering devices fall into this category, which, in fact, includes any ultrasonic system in which it is desirable to perform different functions over a range which extends from 10 to 120 kilocycles. Such a range of operations is made possible by the use of replaceable transducers, each designed to operate efficiently over a selected narrow range.

For example, assuming that the system to be driven ultrasonically is an ultrasonic washing device, including a vat constructed to hold water or other ultrasonic transmitting and cleansing media, a metal plate which includes a protruding screw or stud is brazed to an outer surface of the vat. Thus, a sandwich transducer prepared in accordance with the teachings of the present invention, and having a desired frequency characteristic for the particular activity contemplated, is screwed or otherwise detachably secured to the brazed plate on the bottom of the vat by means of the protruding screw or stud. This enables the use of a rugged transducer which is reliably fastened to the unit, and which is not subject to failure because of the weakness of the peal-strength of a rigid bond at the antinodal junctions. Moreover, such a transducer is readily replaceable for any desired reason.

Similar coupling arrangements are made between the transducer driving unit and the driven systems in the case of ultrasonic welding, soldering, and similar devices.

These and other objects, features and advantages will be realized from a detailed study of the invention in connection with the attached drawings, in which:

FIGURE 1A is a perspective showing of one of the sandwich transducer combinations in accordance with the present invention, in which a screw passes axially through the sandwich, and protrudes in a position to engage the driven system;

FIGURE 1B is a showing in longitudinal section of the combination of FIGURE 1A;

FIGURE 1C is a showing in cross section of the combination of FIGURE 1A;

FIGURE 2A shows a sandwich transducer combination in accordance with the present invention in which the connecting screw is connected between the driven system and one end of one of the backing elements;

FIGURE 2B is a cross sectional showing of the combination of FIGURE 2A;

Figure 6A:
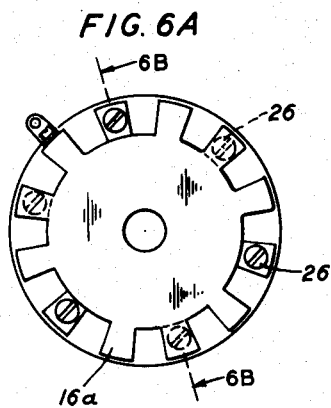
Figure 6B:
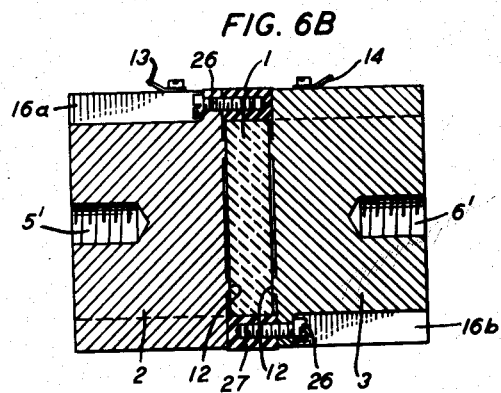
Figure 7A:
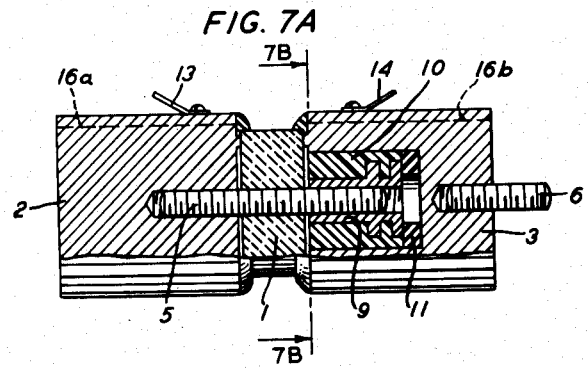
Figure 7B:
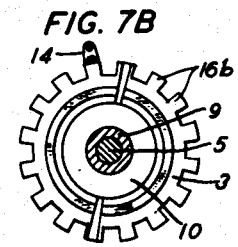
Figure 8A:
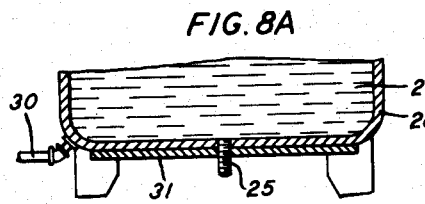
Figure 8B:
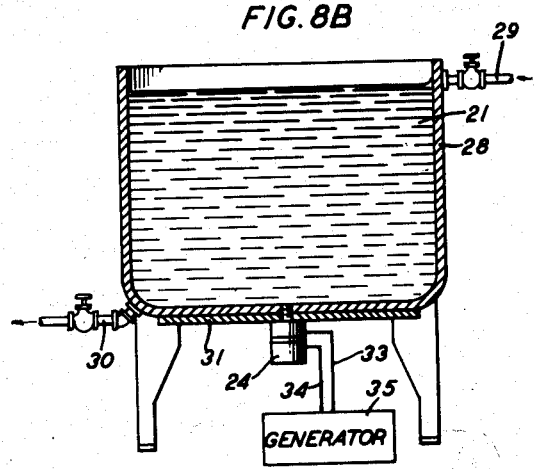
Figure 8C:
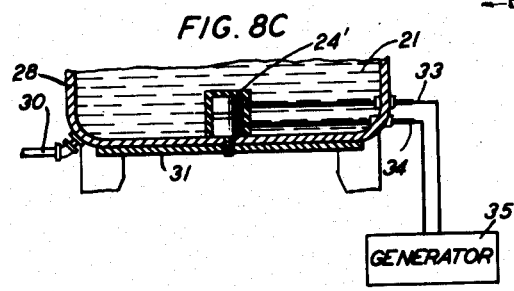

FIGURE 3A is another transducer combination in accordance with the present invention in which the metal backing elements comprise two different metals, and in which an axially disposed screw penetrates through the thickness of one backing element and the crystalline element, terminating in the second backing element; and contact with the driven system is made by means of a shorter screw which protrudes from the other end of the second backing element;

FIGURE 3B is a cross sectional showing of the transducer combination of FIGURE 3A;

FIGURES 3C and 3D are graphical showings, respectively indicating the phase relations of the shear and longitudinal vibrations at each plane through the thickness of the transducer;

FIGURE 4A is a further transducer combination in accordance with the present invention in which the axially disposed connecting screw passes entirely through the thickness of the transducer; and in which the surfaces of the backing elements include longitudinal serrations which protrude slightly outwardly from the outer periphery thereof;

FIGURE 4B is a perspective showing of the combination of FIGURE 4A disassembled to show its parts and how they are combined;

FIGURES 5A and 5B show, respectively, in longitudinal section and in cross section, a combination somewhat similar to the combination of FIGURES 3A and 3B in which the backing elements include longitudinal serrations similar to those shown in the embodiment of FIGURES 4A, 4B;

FIGURES 6A and 6B show, in cross section and in longitudinal section, respectively, another transducer combination in accordance with the present invention, wherein the bond between the central ceramic element and the backing elements is reinforced by screws set in the serrated teeth of the backing elements and embedded in a ring of bonding material surrounding the ceramic element;

FIGURES 7A and 7B show a variation of the transducer combination indicated in FIGURES 4A and 4B, wherein the axially disposed screw is set in a well in one of the backing elements, which is filled with bonding material, extends through the ceramic element and is screwed part-way into the second backing element; and contact is made with a surface of the driven system by means of a second axially disposed screw extending part-way into one of the backing elements;

FIGURE 8A shows a vat of fluid for ultrasonic cleaning purposes to the bottom of which has been fastened a screw or stud connection;

FIGURE 8B shows a completed ultrasonic cleaning system in accordance with the present invention which includes one of the disclosed transducing systems removably connected to the screw or stud indicated in FIGURE 8A;

FIGURE 8C is a further modification of the system of FIGURE 8B, wherein the transducer driving unit is connected to the inner surface of the vat; and FIGURE 9 shows an ultrasonic welding unit including a transducer combination removably connected in accordance with the present invention.

The sandwich transducer system of the present invention can be used as the driving unit for numerous different types of ultrasonic systems, such as, for example, ultrasonic devices for the welding of metal and plastic, ultrasonic soldering units, and ultrasonic washing or cleaning units. In each of such combinations, a specific advantage of the novel transducer combination of the present invention is the facility with which it can be initially assembled and replaced in coupling relation to the driven system. For facility of description, the novel transducing unit of the present invention has been described as one element of the ultrasonic washing device shown in FIGURES 8A, 8B and 8C of the drawings, or as an element of the ultrasonic welder shown in FIGURE 9 of the drawings. However, it will be apparent to those skilled in the art that the detachable transducer unit of the present invention can be used in combination with other types of ultrasonically driven systems, wherever it is advantageous to have a driving unit which is readily replaceable to make repairs in the system, or effect substantial changes in the frequency of the driving unit.

Referring in detail to the drawings, FIGURE 1A shows, in perspective, an electroacoustic transducer having three principal components, an active, electrostrictive crystalline element 1 sandwiched between a pair of metal backing elements 2 and 3, the whole taking the form of a cylinder having an axial length which is a half-wave-length in the resonant frequency for which the system is designed.

The active element 1 may be any piezoelectric crystalline body cut, or polarized to vibrate principally in a resonant-thickness mode of vibration. Although ceramic wafers of barium titanate and related material, in various combinations, have been found suitable for the purposes of the present invention, a preferred ceramic contemplated in the embodiment under description has as its principal component lead zirconate titanate, in one of the formulations discussed, for example, in an article entitled "Variations in Ferroelectric Characteristics of Lead Zirconate Titanate Ceramics Due to Minor Chemical Modifications," Robert Gerson, 31 Journal of Applied Physics 188, January 1960.

The ceramic wafer 1 is dimensioned in accordance with the desired resonant frequency. Such an element may be obtained commercially, in various diameters and generally .5 inch or less in thickness corresponding to a thickness resonant frequency of 100 kilocycles or higher. As a step in its preparation it has been polarized in accordance with well-known prior art practice by the application of a polarizing voltage in a thickness direction substantially normal to the major faces of the wafer, while the temperature was lowered through the Curie temperature. Moreover, it has been aged to give it stable electroacoustic characteristics, poling and aging having been carried out by the suppliers in a manner taught, for example in a bulletin entitled "Aging of Ferroelectrics," New Jersey Ceramic Research Station, Rutgers University, New Brunswick, Technical Report #1, Rt. 1, TR–59–128 (July 1, 1959) (AD–227–737–1004).

As pointed out in the earlier part of the specification, a salient feature of the present invention is the careful cleansing and preparation of the contacting surfaces of the active ceramic wafer element 1, and of the metal backing elements 2 and 3 prior to assemblage into any of the combinations disclosed hereinafter. For example, the wafer 1, when obtained commercially, or after initial prepolarizing treatment may have permanent electrode coatings on its major parallel surfaces. For some embodiments of the present invention, these are carefully removed by lapping to a depth of, say .0005 inch with any of the lapping compounds known in the art, such as, for example, aluminum oxide and water.

After the foregoing treatment, the surfaces of the ceramic wafer 1 are further cleaned by exposing the element to ultrasonic cleaning action in a container of, for example, an isoprophyl alcohol or acetone, or any similar solvent which is characterized by rapid evaporation, and which is not readily absorbed by the ceramic. The ultrasonic vibrations are generated in the cleansing liquid by means of, for example, a 100 to 200 watt generator operating at a frequency of, say 40 kilocycles per second, for about ten minutes. In a similar manner, the metal backing elements 2 and 3, after having been machined to the desired cylindrical dimensions, are also exposed to ultrasonic cleaning in a bath of tepid water, which has been heated to a temperature of between about 150 and 212 degrees Fahrenheit, and wherein ultrasonic waves within the above frequency range have been generated.

The end surfaces of the metal backing elements 2 and 3, which, before ultrasonic cleaning have been ground to a reasonable flatness, are etched, after ultrasonic cleaning, with a 10 to 20 percent solution of hydrochloric acid, or with a solution comprising by weight, one part of sodium dichromate, ten parts of concentrated sulphuric acid and ten parts of water, until they pass what is described as "the water-break test." In accordance with the latter, the metal surface under treatment is held under an open water tap. If the surface has been etched sufficiently clean, no oil or grease will be present, and the water will completely wet the surface. To achieve this degree of cleanliness, it is generally necessary to etch the treated surface from 30 seconds to two minutes.

In the illustrative combination shown in FIGURE 1A in perspective, FIGURE 1B in longitudinal section and FIGURE 1C in cross section, which is designed to resonate at 26 kilocycles per second, the wafer 1 is a ceramic disk one-half inch thick and two inches in diameter. Although in the embodiment under description the cylindrical backing elements 2 and 3 are identical cylinders of steel, each having a diameter of two inches and an axial length of one and one-half inches, it is not necessary that the elements be of steel, or even both of the same metal. In fact, any metal or other homogeneous solids such as ceramics, epoxies, et cetera, may be used for the purposes of the present invention. Metals which have been found particularly suitable for the backing elements 2 and 3 of the combination of FIGURES 1A, 1B, and 1C, in addition to steel, are aluminum and brass, in any combination desired by the designer. Aluminum has been found preferable for some applications because it is a better dissipator of heat than certain other metals, such as steel, which is a poor thermal conductor. Brass has also been found to be useful as a backing element, because it has a thermal conductivity of the order of half that of aluminum. In the case of, for example, aluminum as the forward element 3 and steel as the rear element 2, both elements have the same axial lengths, since the velocity of sound is the same in both metals. However, were brass to be used as the rear element 2 in combination with a forward element 3 of aluminum, the brass element would have a shorter axial dimension, about 0.7 that of the aluminum element, which would be determined by the inverse ratio of the velocities of sound in the two metals. In general, the criterion in determining the ratio of the diameter to length of the cylinders 2 and 3 is the avoidance of radial modes of vibrations, which should not coincide with the chosen longitudinal mode for the combination.

In each of the combinations under description, in preferred form, the three principal elements 1, 2 and 3 are held together by a bonding agent interposed between the contacting surfaces of the backing elements and the ceramic, reinforced by an axially disposed screw or stud, which in some of the disclosed embodiments, such as that disclosed in FIGURES 1A, 1B, and 1C, passes all the way through the three elements and protrudes from the other end; and in other embodiments, passes only part-way through one or more of the elements. In each case, as a particular feature of the present invention, a screw or stud protrudes from one end of the metal backing element 3, or alternatively, an inverse screw hole or fitting is contained therein, for the purpose of providing an unbonded and readily detachable connection between the assembled transducer and a surface of the system to be driven in ultrasonic vibration, which is located at or near an antinode, or area of minimum lateral motion. Although it is possible, in accordance with the present invention, to utilize a transducer combination, such as that indicated in FIGURES 4A and 4B, which will be described in detail hereinafter, without any bonding agent between the contacting surfaces, it has been found that at surfaces near the nodal plane through the center of the ceramic element 1, where there is a high component of lateral motion, the mechanical output of the transducer combination is substantially improved by the use of a rigidly-cured bonding agent between the surfaces, which may take the form of any epoxy resin characterized by a good coefficient of coupling at low temperatures. For the purposes of the present invention, good results have been realized by the use of an epoxy resin obtained commercially from the Shell Chemical Company under the trade name "Epon 8," which is cured according to directions with a curing agent such as diethylene triamine. Preferably, a hardener is used in connection with the curing of the epoxy resin which will provide a strong adhesive coupling, the strength of which does not deteriorate when the sandwich unit is heated up to the Curie temperature of the piezoelectric element. Such catalysts may be obtained commercially from different companies. For excellent strength characteristics at higher temperatures, a catalyst known as "Hardener A", manufactured by the Shell Chemical Company, has been used with the epoxy known as "Epon 8" for the purposes of the present invention.

Alternatively, for the purposes of the present invention, I have employed in those conditions where conductivity is necessary or desirable, a bonding agent comprising an epoxy conductive cement which has been made electrically conductive by the inclusion of particles of finely divided silver. Such a conductive cement is obtainable commercially from the Hysol Company as Hysol Number 4238 (formerly Number 6250). It is characterized by a volume resistivity at 25 degrees centigrade of 0.01 ohm-centimeter, and is usually cured by means of a catalyst which gives the epoxy a good high temperature characteristic up through the Curie temperature of the piezoelectric element. Hysol Number 3469 is known as such a catalyst. However, any similar combination of epoxy and catalyst may be used for this purpose, providing the product has a conductivity of at least 0.01 ohm-centimeter; and it has a solid consistency and exhibits a strength that does not deteriorate when it is heated up through the Curie temperature of the ceramic employed.

Referring again to FIGURES 1A, 1B, and 1C, the steel stud or screw 5, which is, for example, a quarter-inch in diameter, is accommodated in a screw hole along the axis of the outer metal backing element 2 which is lined with an insulating sleeve of phenolic resin or the like. The screw or stud 5 terminates in a well about seven-eighths of an inch across and three-eighths of an inch deep on the outer surface of element 2, where it is held in position and tightened to the desired pressure in the final act of assembling the transducer combination, by means of the hexagonal headed nut 7 which rests on an insulating washer 8, of any material which does not undergo severe deformation under pressure.

The stud 5 in its insulating sleeve 9 is of sufficient length, in the embodiment under description, to extend in an axial direction through the element 2, and through a matching hole reamed in the center of ceramic element 1, terminating in a well 10 recessed in the inner surface of element 3, which has a diameter of, say three-quarters of an inch, and a depth of three-quarters of an inch, the stud 5 resting against an insulating washer 11 of phenolic resin or the like.

Each of the surfaces of the elements 2 and 3, which are designed to make electrical contact with the opposite surfaces of ceramic element 1, is slightly recessed to a depth of about 0.005 inch, and each has protruding from the recess, say from one-quarter to one-eighth of an inch in width, a flat, annular projection 12 which makes annular contact with the bare surface of the crystal element 1 in all but two diametrically opposite positions. For best operation of the transducer, the annular projections 12 are located about one-third of the radial distance in from the outer edge of the cylinders 2 and 3, so as not to rim-clamp the transducer and cause it to resonate in spurious modes. The principal purpose of the projecting partial rings 12, in addition to making electrical contact with surfaces of the active element 1, is to serve as mechanical spacers, providing recesses into which the bonding agent, or epoxy resin, is forced to provide bonding areas 4 between the surfaces of the elements 2 and 3 and the matching surfaces of the crystal element 1.

Ordinarily, between 500 and 1,500 volts, root mean square, at about 100 watts power, are applied across the elements 2 and 3 by applying a potential source to clip contacts 13 and 14, to drive the crystal element 1. In normal practice, the element 2 is held at ground potential, whereupon the washer 8 and sleeve 9 serve to insulate the stud or screw member 5 from the metallic element 2. In the embodiment under description, the presence of sleeve 9 and washer 8, although desirable, is not absolutely necessary, because of additional insulation provided by the recessed area 10 in element 3, which is filled with an insulating material such as an epoxy resin described above, and in which one end of the screw or stud 5 is embedded, pressing against the insulating spacer 11.

In assembling the unit, the insulating washer or spacer 11 is dropped into the bottom of the well 10, after which the latter is filled with an epoxy resin such as that sold commercially by the Shell Chemical Company under the trade name "Epon 8"; and the stud or screw 5 is then pushed into place. The epoxy selected to fill cavity 10 should be nonconducting, and should have sufficient strength, after baking to hold stud 5 securely in place, yielding little or no plastic flow in response to changes in temperature and pressure. During this process, all of the air bubbles caught in the plastic epoxy are forced to the surface and broken. A preliminary assemblage, comprising the plastic epoxy which has been forced into the cavity 10, and the stud 5 pressing against the insulating spacer 11, is baked in an over for a total of two hours at 200 degrees Fahrenheit, until the epoxy is cured. The remaining elements of the combination are then assembled, the element 2, being threaded onto the free end of the stud 5, which has been encased in sleeve 9, the insulating washer 8 and nut 7 being then screwed into place. The screw or stud 6, which in the embodiment of FIGURES 1A, 1B, and 1C is separate from the stud 5, is screwed into place in line with the stud 5 at the outer end of the element 3. Epoxy resin comprising one of the types previously described, and the requisite curing agents, are forced under a vacuum of, say 20 to 40 pounds per square inch, into the recesses between the annular spacers 12, to form bonds 4 between the surfaces of the crystalline wafer 1 and the backing elements 2 and 3. The epoxy resin used for this purpose should firmly adhere to the surfaces of the crystalline transducer 1, and also to the metallic elements 2 and 3, so as to eliminate all air from the region, forming a solid which functions to transmit pressure waves away from crystalline element 1. The nut 7 is tightened into position with a torque wrench, to a torque of 50 to 200 inch-ounces. The entire assemblage is then baked in an oven for a period of two hours at 200 degrees Fahrenheit, until the epoxy is cured. As pointed out above, for better performance, a conducting epoxy having a conductivity of at least 0.01 ohm-centimeter at 25 degrees centrigrade, may be employed. An example of this is a conductive epoxy cement obtained commercially from the Hysol Company as Number 4238, which is cured with Hysol hardener Number 3469, or a similar combination.

In accordance with the present invention, the purpose of the epoxy or bonding medium utilized for the bonds 4 is to provide a mechanical or acoustical conduction medium which functions to transmit the mechanical pressure waves emanating through the transducer and the entire assemblage so that it resonates as an integral unit.

If electrically conducting bonding material is not used for the bonds 4, then the projections 12, which in FIGURE 1B appear as having rectangular cross section, are formed to terminate in a sharp, angular edge in order to make better contact with the surfaces of the crystalline body 1. For example, assuming that the conventional silver electrodes are present on the surfaces of the crystalline element 1, the projections 12 function to penetrate the areas of epoxy to make contact with the silver surfaces. In those modifications in which the silver coatings have been removed from the surfaces of the crystal element 1, projections 12, shaped as sharp contacting edges, make electrical contact with the bare crystal surfaces, thereby providing excellent mechanical output. Although such an arrangement may affect the characteristics of the circuit, increasing the shunt capacitance or the blocked capacitance, this can be compensated for electrically in the external circuit.

As previously stated, if an electrically conducting epoxy is utilized in the bonding areas 4, it is no longer necessary that the projections 12 pierce the layer of bonding material to make electrical contact with the crystalline surface. In such a case, they merely serve as mechanical spacers, providing a glue line to the depth of 0.005 inch. They can then be rectangular in cross section, or any other shape desired for practical purposes.

FIGURES 2A and 2B show in longitudinal section and cross section, respectively, a modification of the sandwich transducer in accordance with the present invention in which the elements 1, 2, and 3 are bonded together by means of epoxy resin, which has been forced into the shallow circular recesses 4 in each of the inner faces of metal elements 2 which are held in contact against the faces of the crystal element 1. Annuli of rectangular cross section, make contact between each of the elements 2 and 3 and the outer peripheral edge of the faces of crystalline element 1. A screw hole, centrally disposed, is reamed in the outer surface of the cylinder 3 to receive the screw or stud 6, which in FIGURE 2A, is shown screwed or connected into a contacting surface of the driven system 15. As pointed out earlier in the specification, a transducer combination in accordance with the present invention can be detachably coupled to any type of system, such as a welding or soldering system, or, alternatively, an ultrasonic washing or cleaning device, to drive it ultrasonically. FIGURE 2A shows a coupling between the sandwich transducer in accordance with the present invention, including elements 1, 2, and 3, wherein the coupling between element 3 and the surface of the driven system 15 is secured entirely by means of the screw or stud 6, the surfaces of elements 3 and 15 making direct contact without any permanent bonding medium being interposed therebetween. A small amount of silicone grease, or other semisolid acoustic coupling medium interposed between surfaces of elements 3 and 15 has been found to give adequate acoustic coupling.

The reason for this is better understood by reference to FIGURES 3A and 3B, which show, in longitudinal section and cross section, a further modification of the sandwich transducer in accordance with the present invention, wherein the screw or stud 5, instead of terminating in a well 10, filled with epoxy resin or other insulating material, as disclosed with reference to FIGURES 1A and 1B, screws directly into the element 3. The length of the stud 5 is not critical. In fact, the system has been found to operate most efficiently when the stud or screw 5 extends the entire axial length of the three elements 1, 2, and 3, the end thereof protruding from the outer end of element 3 in place of the separate stud or screw 6. It will be noted, with reference to FIGURE 3A that the thickness of element 2 is substantially less than that of element 3, because of the fact that in the embodiment there represented, element 3 consists of aluminum and element 2 of brass, the thicknesses of the elements 2 and 3 being determined from the inverse ratio of the speed of sound in the respective metals. While in each of the embodiments shown and described herein, the stud or screw 5 has been disclosed as preferably of metal, it need not necessarily be of metal, but may be of any nonmetallic material having comparable tensile strength and stiffness, and capable of being cast or formed in the desired shape, and screw threaded if that is desired.

It will be noted also, with reference to FIGURE 3A that there is no showing of any permanent bonding material between surfaces of elements 1 and 2, 1 and 3, and 3 and 15. While such an arrangement has been found to be operative, it is less efficient than some of the other disclosed embodiments for the following reasons.

Referring to the diagrams 3C and 3D, the former representing the shear wave vibrational displacement component and the latter the longitudinal vibrational component, both over the length of the transducing system which is an electrical half-wave-length in the resonant frequency of the system, it will be seen that the shear component has maximum displacement at the center of element 1, dropping off to substantially zero at the ends of the transducing system, whereas the longitudinal displacement is practically zero at the center of the crystalline element 1, and is a maximum at the ends of the transducing system. Accordingly, it is desirable to securely bond the interfaces between the surfaces of crystalline element 1 and the inner surfaces of elements 2 and 3, where the component of lateral motion is large; and it is neither necessary nor desirable to apply a rigid bond at the interface between the element 3 and the surface 15 of the driven system, where the component of lateral motion is substantially zero.

A preferred embodiment of the present invention is indicated in FIGURES 4A and 4B of the drawings, which is respectively shown in longitudinal section and in perspective, so that it is apparent how the several components are fitted together. It will be noted that in the embodiment of FIGURES 4A and 4B, the stud 5 in its insulating sleeve 9 extends the entire length of the combination of elements 1, 2, and 3, terminating in a bolt 15′, which, for purposes of illustration, takes the place of the driven system. Each of elements 1, 2, and 3 contains an axially located bore of a proper size to accommodate the stud 5 in the insulating sleeve 9. As in the embodiment described with reference to FIGURES 1A, 1B, and 3A and 3B, the cylindrical element 2 contains a well 18 designed to accommodate the headed end of stud 5, sufficient space being provided so that in the final assemblage a torque or between 50 and 200 inch-ounces can be applied to stud 5.

A specific novel feature employed in the embodiment shown in FIGURES 4A and 4B, which may also be employed in the embodiments previously and subsequently described herein, is the spring washer 20 which serves the primary purpose of equalizing variations in contact pressures between the component elements 1, 2, and 3 which occur under different environmental conditions, such as changes in ambient temperature and pressure. The spring washer 20 is threaded onto stud 5, and is disposed in the well 18 where it is sandwiched between the ceramic washer 21, beneath the screw head 7, and the insulating washer 8 which rests at the bottom of well 18. Spring washer 20 is of a type patented in France in 1867 by Julian F. Belleville, and more recently described and analyzed mathematically by Alman and Lazlo in the Transactions of the American Society of Mechanical Engineers, May 1936. Further design data about the Belleville spring washer is given in a monograph published by the Wallace Barnes Company, a division of the Associated Spring Corporation, copyright 1955.

As in the previous embodiments, provision is made, by means of spacers 12, for rigid bonds of epoxy or the like to be interposed between the contiguous surfaces of elements 1 and 2, and 1 and 3, making dual contact therewith. However, no rigid bonding agent is applied to the interface between element 3 and the driven system 15′, but only a small amount of silicone grease, or the like, to facilitate acoustic coupling.

Another novel feature of the embodiment disclosed in FIGURES 4A and 4B, which might also be applied to any of the embodiments previously described, is a series of surface serrations 16a and 16b of rectangular cross section, about an eighth of an inch wide and an eighth of an inch deep, spaced about an eighth of an inch apart, which run the length of each of the elements 2 and 3, parallel to the principal axes thereof, and which are all around the curved surfaces of the cylinders, except for areas 17a and 17b, which have been left flat, and provided with screw holes for mounting the unit. The purpose of the serrations 16a and 16b is to provide greater surface area for rapid heat dissipation while the unit is being driven to vibrate ultrasonically at relatively high powers, of say 100 to 500 watts.

Another modification of the sandwich transducers of the present invention is disclosed in longitudinal and cross section, respectively, in FIGURES 5A and 5B of the drawings. This is substantially similar to the embodiment of FIGURES 3A and 3B, described hereinbefore, except for the fact that 5, as presently shown is a stud instead of a screw, elements 2 and 3 are formed of the same metal, and the outside, curved surfaces of elements 2 and 3 are serrated for the purpose of heat dissipation, as shown with respect to the embodiment of FIGURES 4A and 4B. Moreover, as in the other preferred embodiments, the inner surfaces of the elements 2 and 3 are provided with the partial annular rings 12 which provide slight recesses between the contacting surfaces to accommodate the rigid epoxy bonds 4. At the other end of the element 3, a screw hole 6' is provided to accommodate a screw set into a surface of the driven system, so that the latter can be screwed into the transducer, into acoustic coupling relation with the outer surface of element 3, without the presence of any rigid bonding agent. As in the previous embodiment, silicone grease or the like facilitates acoustic coupling.

FIGURES 6A and 6B show in cross section, and longitudinal section, respectively, another variation of the transducer combination of the present invention, wherein there is no axial screw or stud, as in most of the previously described embodiments. Elements 1, 2, and 3 are bonded together, by forcing epoxy into the recesses provided by the annular projections 12 slightly protruding from the inner surfaces of elements 2 and 3, contacting the major faces of crystalline wafer 1, as previously described. As in the two previously described embodiments, element 2 and 3 are each provided with heat dissipating serrations 16a and 16b, which protrude outwardly about one-eighth of an inch from the surfaces of elements 2 and 3, beyond the edge of the crystalline wafer 1. Alternate ones of the serrations are shortened or cut-off about one-eighth of an inch in a longitudinal direction from the respective surfaces of the crystalline wafer 1, forming teeth-like flanges, in which are reamed screw holes to accommodate screws 26. The annular space between the rings of teeth-like flanges on each side of the crystalline wafer 1 is filled with an insulating epoxy, in which the screws 26 are embedded, alternating between one side and the other, thereby making the combination more rigid. A modification of this arrangement is to dispense with the serrations and provide the elements 2 and 3 with solid circular flanges (instead of the rings of teeth), say one-eighth of an inch wide and one-quarter of an inch deep, which have screw holes at regular intervals to accommodate screws 26 in an insulating bed 27.

In the embodiment of FIGURES 6A and 6B, the axially located screw holes 5' and 6' provide for coupling the transducer driving unit to a system to be driven.

Another variation of a transducer unit in accordance with the present invention is shown in FIGURES 7A and 7B of the drawings. This embodiment resembles that of FIGURES 1A and 1B of the drawings, which includes a well 10 in element 3, which is filled with a rigid, insulating bonding agent, such as epoxy or the like, which is formed around an insulating sleeve 9. The screw 5 is screwed into place in the sleeve 9 in the epoxy filled well 10, its end against the insulating spacer 11. The other end of screw 5 is threaded through the axial hole in the ceramic crystalline wafer 1, and terminates in a screw hole in the metal cylinder 2. Another screw 6 is accommodated in an aligned screw hole at the other end of the cylindrical element 3. This serves to connect the transducer in acoustic coupling relation, without a rigid bonding agent, to a system to be driven in ultrasonic vibrations. Like the combinations disclosed in FIGURES 4A and 4B and 5A and 5B, the combination here shown includes longitudinal serrations 16a and 16b on elements 2 and 3, respectively, for the purpose of heat dissipation.

Referring now to FIGURES 8A and 8B of the drawings, a system is shown wherein one or more of the combinations of the present invention can be utilized to specific advantage, as a readily detachable driving unit. The vat 28, which may, for example, be a metal shell of any of the types well-known in the art, is filled with any liquid which serves as an efficient ultrasonic wave transmitting medium. For example, this may be a solution of hot water and detergent. The vat 28 is connected to a conventional liquid source, and means, including a pump, for forcing the liquid in through the inlet valve 29 under the desired amount of pressure. Valve 30 serves to drain the liquid from vat 28 when the operation is complete. In accordance with the present novel system, a sandwich transducing unit 24, which may take any of the forms described in detail with reference to the previous figures, is screwed onto the screw stud 25, which is permanently attached to a metal plate 31 which is welded or brazed onto the bottom of the vat 28, as shown in FIGURE 8A. As previously pointed out, no rigid bonding agent is interposed between cylindrical section 3 of the transducing sandwich 24 and the surface of the plate 31, which may be, for example, steel, brass, or aluminum, or any other metal having suitable ultrasonic transmitting characteristics, which has been initially cleaned ultrasonically and otherwise prepared by etching in the manner described hereinbefore with reference to the surfaces of the metal backing elements 2 and 3 to give it optimum acoustic coupling characteristics. The juxtaposed surfaces of cylinder 3 and plate 31 have a silicone grease or similar acoustic transmitting medium applied to facilitate coupling. The transducer 24 is then screwed into the stud 25 by applying a torque of between 50 and 200 inch-ounces. Transducing unit 24 is connected through lead wires 33 and 34 to the high frequency generator 35, operating at a voltage of say, 1,500 volts, root mean square, and a wattage within the range of, say, 25 to 150 watts, which may be of any of the types well-known in the art, such as disclosed, for example, in FIGURES 7–5 and 7–17 of "Ultrasonics," by Benson Carlin, Second Edition, McGraw-Hill Book Company, Inc., 1960, pages 164 and 174.

It will be apparent that in accordance with the present invention, units of many different sizes, representing a plurality of different frequency bands over the range from ten to 100 kilocycles per second, can be readily substituted, one for another, thereby giving the cleaning unit described a tremendous flexibility, not otherwise realizable.

A variation of the ultrasonic washing device shown and described with reference to FIGURE 8B may be made in accordance with the inset FIGURE 8C, wherein the driving unit 24' is encased in a cured epoxy resin, or another waterproof coating, and placed inside of the vat 28. As a further variation, a large number of units of the type of sandwich transducer 24 can be utilized simultaneously to generate ultrasonic vibrations in the medium 21. The readily replaceable character of the units gives further advantage to such an arrangement.

It will be further apparent that many other different types of ultrasonic systems, such as ultrasonic soldering devices, or ultrasonic welding devices, such as shown in FIGURE 9 of the drawings, can be combined in accordance with the teachings of the present invention to utilize one or more readily detachable sandwich transducing units of one of the types disclosed or taught herein.

However, it will be apparent to those skilled in the art that the present invention is not limited or circumscribed by any of the specific embodiments shown herein by way of illustration, but may assume numerous forms and variations within the scope of the appended claims.

What I claim is:

1. An ultrasonic washing device comprising in combination a container for liquid ultrasonic transmitting medium, means for filling said container with said medium and for exhausting said medium from said container, a fitting comprising a metallic plate integrally bonded to a surface of said container, a bolt fixed at one end to said plate, and the other end of said bolt protruding through said plate, and an ultrasonic transducer removably fastened to said bolt, said transducer comprising in combination a piezoelectric element constructed to vibrate in a resonant-thickness mode of vibration, a pair of metallic backing elements forming with said piezoelectric element a sandwich the electrical thickness of which approximates a half-wave-length in a resonant-thickness frequency of said piezoelectric element in the direction of vibration thereof, said bolt axially disposed to engage one end of said sandwich to fasten said sandwich to said metallic plate at substantially an antinode in said resonant-thickness vibrations, coupling said sandwich to said plate in contiguous ultrasonic coupling relation independently of the presence of rigid bonding material at the interface between said plate and said sandwich.

2. An ultrasonic sandwich transducer comprising in combination an active element which includes a disk of piezoelectric ceramic constructed to vibrate in a resonant-thickness mode of vibration, and having a pair of opposing major surfaces, a pair of cylindrical metallic backing elements, each having a surface the diameter of which substantially matches the diameter of a respective surface of said active element, and each presenting to said respective surface an inwardly directed discontinuous annular ring which protrudes a few thousandths of an inch from the surface of said backing element for electrically contacting the said respective surface of said active element, a first quantity of rigidly-cured acoustic coupling bonding material being accommodated at the interfaces between said surfaces in the spaces formed by said protruding annular rings, one said backing element having an inwardly directed, centrally located well the depth of which extends part-way through the thickness of said element, the other said backing element recessed at the outer end thereof and having an axially located bore, said active element having a matching axially located bore, a bolt extending axially from the recess in the other said backing element through said bore therein and in said active element and terminating in the well in the one said backing element, means including a second quantity of a nonelectrically-conducting rigidly-cured acoustic coupling bonding agent interposed into said well and disposed to hold the terminal end of said bolt in rigid electrically insulated relation in said well in said one backing element, the combination including said ceramic disk and said backing elements being substantially a half-wave-length in a selected longitudinal-mode frequency of said transducer, wherein said transducer vibrates with a node in said resonant-thickness frequency substantially at the center of said active element and antinodes in said resonant-thickness frequency at substantially the outer ends of said backing elements, and the one said backing element having an outwardly directed screw-threaded bore in the outer end thereof for accommodating a screw connection axially aligned with said bolt.

3. A combination in accordance with claim 2 wherein said first quantity of rigidly-cured acoustic coupling bonding material contains comminuted electrical conducting material.

4. A combination in accordance with claim 2 wherein the external curved surfaces of said backing element include protruding therefrom a series of serrations extending parallel to the major axes of said elements for facilitating the dissipation of heat in said elements.

5. An ultrasonic sandwich transducer comprising in combination an active element with includes a disk of piezoelectric ceramic constructed to vibrate in a resonant-thickness mode of vibration, and having a pair of opposing major surfaces, a pair of cylindrical metallic backing elements, each having a surface the diameter of which substantially matches the diameter of a respective surface of said active element, and each presenting to said respective surface an inwardly directed discontinuous annular ring which protrudes a few thousandths of an inch from the surfaces of said backing element for electrically contacting the said respective surface of said active element, a quantity of rigidly-cured acoustic coupling bonding material being accommodated at said interfaces in the spaces formed by said protruding annular rings, one of said backing elements recessed at the outer end thereof, and said one backing element and the other said backing element and said active element each having matching bores for accommodating an axially disposed bolt, said bolt extending from said recess through said one backing element and said active element and passing at least part-way through said other backing element, the combination including said ceramic disk and said backing elements being substantially a half-wave-length in a selected longituidnal-mode frequency of said transducer, wherein said transducer vibrates with node in said resonant-thickness frequency substantially at the center of said active element and antinodes in said resonant-thickness frequency at substantially the outer ends of said backing elements, and means at the outer end of said other backing element for forming a rigid mechanical acoustic coupling connection for detachably coupling said transducer to a vibratory system, independently of an interposed rigid bonding medium at said connection.

6. A transducer combination in accordance with claim 5 wherein said bolt extends from said recess through said one backing element and said active element and entirely through said second backing element, and wherein said means for forming a rigid acoustic coupling comprises the terminal end of said bolt protruding at the other end of said second backing element.

7. A combination in accordance with claim 5 wherein said means at the outer end of said other backing element comprises an outwardly directed screw hole aligned with said bolt for accommodating a screw fitting for making a rigid, detachable, acoustic coupling connection to a vibratory system.

8. A combination in accordance with claim 5 wherein said quantity of rigidly-cured acoustic coupling bonding material contains comminuted electrical conducting material.

9. A combination in accordance with claim 5 wherein the external curved surfaces of said backing elements include protruding therefrom a plurality of serrations in a direction parallel to the major axes of said elements for facilitating the dissipation of heat in said elements.

10. An ultrasonic sandwich transducer comprising in combination an active element which includes a disk of piezoelectric ceramic having a pair of opposed major surfaces and designed to vibrate in a principal resonant-thickness mode of vibration, a pair of cylindrical backing elements each having a surface with a diameter matching the diameter of a respective major surface of said active element, each of the inner surfaces of said backing elements having an inwardly directed discontinuous annular ridge protruding a few thousandths of an inch for making electrical contact with a respective surface of said active element, a quantity of rigidly-cured acoustic coupling bonding material interposed in the interface between said surfaces in the space formed by said annular ridge protrusions, the combination comprisng said backing elements and said active element having an electrical length which approximates a half-wave-length in a selected longitudinal thickness mode frequency of said transducer, wherein said transducer vibrates with a node in said resonant-thickness mode substantially at the center of said active element and antinodes in said resonant-thickness mode substantially at the ends of said backing elements, and means at the outer end of at least one of said backing elements for forming a rigid mechanical acoustic coupling connection for detachably coupling said transducer to a vibratory system independently of the presence of an interposed rigid bonding medium at said connection.

11. A combination in accordance with claim 10 wherein said means for forming a rigid mechanical acoustic coupling connection comprises a screw fitting axially disposed at the outer end of at least one of said backing elements.

12. A combination in accordance with claim 10 wherein said quantity of bonding material includes comminuted conducting material.

13. A combination in accordance with claim 10 wherein said inwardly directed annular ridges are located at the periphery of the surfaces of said backing elements directed toward the respective major surfaces of said active element.

14. A combination in accordance with claim 10 wherein the external curved surfaces of said backing elements include protruding therefrom a plurality of serrations in a direction parallel to the major axes of said elements for facilitating the dissipation of heat in said elements.

15. A transducer in accordance with the present invention which comprises in combination a cylindrical piezoelectric ceramic element having an axial bore, a pair of cylindrical metallic backing elements, each having an axial bore which matches the bore of said ceramic element, the curved surfaces of each of said backing elements notched in a series of longitudinally extended serrations, and each of said backing elements presenting to one of the major surfaces of said ceramic element a matching surface from which a pair of semiannular rings protrude a few thousandths of an inch making electrical contact with said respective major surface and creating a slight spacing between said surfaces when placed in juxtaposition, the bore of one of said backing elements terminating in a well recessed in the outer surface thereof, an elongated bolt having a head and encased in an insulating sleeve, said bolt having been threaded through a metal washer and an insulating washer and a spring washer, and the head of said bolt rigidly torqued into position against the tension of said spring washer resting on said metal and insulating washers, said bolt in said insulating sleeve extending through the bores in said one backing element and the other said backing elements and said ceramic element and maintaining them in rigid juxtaposed relation, a bonding medium having been interposed into and cured in the said spacings between said juxtaposed surfaces, the total length of said transducer including said backing element and said ceramic element being substantially about a half-wave-length in a selected frequency of vibration in said resonant-thickness mode of vibration whereby the outer ends of said backing elements are substantially at antinodes in said vibrations, said bolt having a substantial extent beyond the end of the other said element for making rigid detachable mechanical acoustical coupling contact with a vibratory system independently of the presence of a solid acoustical coupling medium interposed between the outer end of the other said backing element and said vibratory system.

16. In combination, an ultrasonic transducer comprising a cylindrical piezoelectric element having a pair of substantially parallel flat major surfaces, said element constructed to vibrate in a resonant-thickness mode of vibration, said element having electrode means applied to the opposite flat major surfaces thereof, a pair of cylindrical backing elements disposed coaxially with and in sandwich relation to said piezoelectric element, each of said cylindrical backing elements presenting a matching surface for engagement with a major surface of said piezoelectric element, an ultrasonic coupling medium interposed between each of said major surfaces and the respective matching surface of said backing elements, the sandwich comprising said piezoelectric element and said backing elements having a thickness which approximates a half wavelength in said resonant-thickness vibrations, whereby the end surfaces of said transducer lie in approximately antinodal planes, one of said end surfaces containing an axially disposed well, said piezoelectric element and a portion of each of said backing elements having axially aligned bores, means for maintaining said backing elements and said piezoelectric element under substantial contacting pressure comprising a rod disposed in said axially aligned bores with the head thereof mounted under substantial torque against the bottom of said well, said rod extending from said well through one said backing element and said piezoelectric element and terminating in the second said backing element, and an insulating sleeve encompassing said rod in said axially aligned bore.

17. An ultrasonic system including in combination an ultrasonic transducer comprising a cylindrical piezoelectric element having a pair of substantially parallel flat major surfaces, said element constructed to vibrate in a resonant-thickness mode of vibration, said element having electrode means applied to the opposite flat major surfaces thereof, a pair of cylindrical backing elements disposed coaxially with and in sandwich relation to said piezoelectric element, each of said cylindrical backing elements presenting a matching surface for engagement with a major surface of said piezoelectric element, an ultrasonic coupling medium interposed between each of said major surfaces and the respective matching surface of said backing elements, the saindwich comprising said piezoelectric element and said backing elements having a thickness which approximates a half wavelength in said resonant-thickness vibrations, whereby the end surfaces of said transducer lie in approximately antinodal planes, one of said end surfaces containing an axially disposed well, said piezoelectric element and a portion of each of said backing elements having axially aligned bores, means for maintaining said backing elements and said piezoelectric element under substantial contacting pressure comprising a rod disposed in said axially aligned bores with the head thereof mounted under substantial torque against the bottom of said well, said rod extending from said well through one said backing element and said piezoelectric element and terminating in the second said backing element, an insulating sleeve encompassing said rod in said axially aligned bore, a load system comprising a solid body to be vibrated ultrasonically, the other end surface of said transducer juxtaposed in ultrasonic coupling contact with a rigid surface of said load system, means for maintaining said juxtaposed ultrasonic coupling contact comprising an axially mounted stud interposed to hold said surfaces together in ultrasonic coupling relation independently of the presence of any solid bonding medium between said surfaces.

18. An ultrasonic sandwich transducer comprising in combination an active element which includes a disk of piezo-electric material constructed to vibrate in a resonant-thickness mode of vibration, and having a pair of opposing major surfaces, a pair of cylindrical backing elements coaxial with and disposed in sandwich relation with said active element, and each presenting to a respective one of said major surfaces an inwardly directed discontinuous annular ring which protrudes a few thousandths of an inch from the surface of said backing element for electrically contacting the said respective surface of said active element, a first quantity of rigidly-cured acoustic coupling bonding material being accommodated at the interfaces between said surfaces in the spaces formed by said protruding annular rings, one said backing element having an inwardly directed, centrally located well the depth of which extends part-way through the thickness of said element, the other said backing element recessed at the outer end thereof and having an axially located bore, said active element having a matching axially located bore, a bolt extending axially from the recess in the other said backing element through said bore therein and in said active element and terminating in the well in the one said backing element, means including a second quantity of nonelectrically-conducting rigidly-cured acoustic coupling bonding agent interposed into said well and disposed to hold the terminal end of said bolt in rigid electrically insulated relation in said well in said one backing element, the combination including said active element and said backing elements being substantially a half wavelength in a selected longitudinal mode frequency of said transducer, wherein said transducer vibrates with a node in said resonant-thickness frequency substantially at the center of said active element and antinodes in said resonant-thickness frequency at substantially the outer ends of said backing elements, and means at the outer end of at least one of said backing elements for forming a rigid mechanical acoustical coupling connection for detachably coupling said transducer to a vibratory system independently of the presence of an interposed rigid bonding medium at said connection.

19. An ultrasonic sandwich transducer comprising in combination an active element which includes a disk of piezo-electric material having a pair of opposed major surfaces and designed to vibrate in a principal resonant-thickness mode of vibration, a pair of cylindrical backing elements coaxial with and disposed in sandwich relation with said active element, each of the inner surfaces of said backing element having an inwardly directed discontinuous annular ridge protruding a few thousandths of an inch for making electrical contact with a respective surface of said active element, a quantity of rigidly-cured acoustic coupling bonding material interposed in the interface between said surfaces in the space formed by said annular ridge protrusions, the combination comprising said backing elements and said active element having an electrical length which approximates a half wavelength in a selected longitudinal thickness mode frequency of said transducer, wherein said transducer vibrates with a node in said resonant-thickness mode substantially at the center of said active element and antinodes in said resonant-thickness mode substantially at the ends of said backing elements, and means at the outer end of at least one of said backing elements for forming a rigid mechanical acoustic coupling connection for detachably coupling said transducer to a vibratory system independently of the presence of an interposed rigid bonding medium at said connection.

20. An ultrasonic system including in combination an ultrasonic transducer comprising a cylindrical piezoelectric element having a pair of substantially parallel flat major surfaces, said element constructed to vibrate in a resonant-thickness mode of vibration, said element having electrode means applied to the opposite flat major surfaces thereof, a pair of cylindrical backing elements disposed coaxially with and in sandwich relation to said piezoelectric element, each of said cylindrical backing elements presenting a matching surface for engagement with a major surface of said piezoelectric element, an ultrasonic coupling medium interposed between each of said major surfaces and the respective matching surface of said backing elements, the sandwich comprising said piezoelectric element and said backing elements having a thickness which approximates a half wavelength in said resonant-thickness vibrations, whereby the end surfaces of said transducer lie in approximately antinodal planes, said piezoelectric element and a portion of each of said backing elements having axially aligned bores, means for maintaining said backing elements and said piezoelectric element under substantial contacting pressure comprising a rod disposed in said axially aligned bores with the head thereof mounted under substantial torque adjacent the end of one said backing element and extending through said one backing element and said piezoelectric element and terminating in the second said backing element, an insulating sleeve encompassing said rod in said axially aligned bore, a load system comprising a solid body to be vibrated ultrasonically, the other end surface of said transducer juxtaposed in ultrasonic coupling contact with a rigid surface of said load system, the sole means for rigidly maintaining said juxtaposed ultrasonic coupling contact comprising an axially mounted stud interposed to hold said surfaces together in ultrasonic coupling relation.

References Cited in the file of this patent
UNITED STATES PATENTS

| | | |
|---|---|---|
| 2,468,550 | Fruth | Apr. 26, 1949 |
| 2,799,788 | Fitzgerald et al. | July 16, 1957 |
| 2,895,061 | Probus | July 14, 1959 |
| 2,945,208 | Samsel | July 12, 1960 |
| 2,947,886 | McGunigle | Aug. 2, 1960 |
| 2,947,889 | Rich | Aug. 2, 1960 |
| 3,022,814 | Bodine | Feb. 27, 1962 |
| 3,066,232 | Branson | Nov. 27, 1962 |
| 3,094,314 | Kearney et al. | June 18, 1963 |